(12) United States Patent
Ahn et al.

(10) Patent No.: US 11,582,797 B2
(45) Date of Patent: Feb. 14, 2023

(54) METHOD AND DEVICE FOR MITIGATING INTERFERENCE IN UNLICENSED BAND

(71) Applicant: LG ELECTRONICS INC., Seoul (KR)

(72) Inventors: Joonkui Ahn, Seoul (KR); Seonwook Kim, Seoul (KR); Changhwan Park, Seoul (KR); Hanjun Park, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 17/040,509

(22) PCT Filed: Apr. 4, 2019

(86) PCT No.: PCT/KR2019/004004
§ 371 (c)(1),
(2) Date: Sep. 22, 2020

(87) PCT Pub. No.: WO2019/194603
PCT Pub. Date: Oct. 10, 2019

(65) Prior Publication Data
US 2021/0045154 A1  Feb. 11, 2021

Related U.S. Application Data (60) Provisional application No. 62/653,530, filed on Apr. 5, 2018.

(30) Foreign Application Priority Data

May 9, 2018 (KR) .................. 10-2018-0052835
May 18, 2018 (KR) .................. 10-2018-0057029

(51) Int. Cl.
*H04W 74/08* (2009.01)
*H04B 17/336* (2015.01)
(Continued)

(52) U.S. Cl.
CPC ...... *H04W 74/0808* (2013.01); *H04B 17/336* (2015.01); *H04W 16/28* (2013.01); *H04W 24/10* (2013.01); *H04W 74/0833* (2013.01)

(58) Field of Classification Search
CPC . H04W 74/0808; H04W 16/28; H04W 24/10; H04W 74/0833; H04W 24/08;
(Continued)

(56) References Cited

U.S. PATENT DOCUMENTS

2017/0265096 A1* 9/2017 Goto .................. H04W 56/001
2019/0116591 A1* 4/2019 Yerramalli ............ H04L 1/1685
(Continued)

FOREIGN PATENT DOCUMENTS

KR   20160006681   1/2016
WO   2016/006857   1/2016
(Continued)

OTHER PUBLICATIONS

PCT International Application No. PCT/KR2019/004004, International Search Report dated Jul. 11, 2019, 2 pages.
(Continued)

*Primary Examiner* — Habte Mered
(74) *Attorney, Agent, or Firm* — Lee Hong Degerman Kang Waimey (57) ABSTRACT

A wireless device in an unlicensed band receives from a base station a request signal requesting initiation of downlink (DL) transmission. If carrier sensing (CS) is performed and a wireless medium idles, the wireless device transmits to the base station a response signal accepting the initiation of the DL transmission. The CS is performed with respect to a receive (RX) beam direction obtained from the request signal.

10 Claims, 8 Drawing Sheets

(51) Int. Cl.
*H04W 16/28* (2009.01)
*H04W 24/10* (2009.01)

(58) Field of Classification Search
CPC .... H04B 17/336; H04B 7/0695; H04B 7/088; H04B 7/0617
See application file for complete search history.

(56) References Cited

U.S. PATENT DOCUMENTS

| | | | |
|---|---|---|---|
| 2019/0190668 A1* | 6/2019 | Lei | H04L 5/0046 |
| 2019/0246412 A1* | 8/2019 | Noh | H04W 84/12 |
| 2019/0261412 A1* | 8/2019 | Novlan | H04W 72/0413 |
| 2020/0092871 A1* | 3/2020 | Axnäs | H04L 27/26025 |
| 2020/0314906 A1* | 10/2020 | Goyal | H04B 7/0695 |
| 2020/0359426 A1* | 11/2020 | Pan | H04W 74/0808 |
| 2021/0014903 A1* | 1/2021 | Zhang | H04W 74/0833 |
| 2021/0051616 A1* | 2/2021 | Park | H04J 11/0069 |
| 2021/0058967 A1* | 2/2021 | Oteri | H04W 72/042 |
| 2021/0153107 A1* | 5/2021 | Xu | H04W 56/001 |
| 2021/0153162 A1* | 5/2021 | Chen | H04W 68/005 |

FOREIGN PATENT DOCUMENTS

| | | |
|---|---|---|
| WO | 2016/144141 | 9/2016 |
| WO | 2017/155305 | 9/2017 |

OTHER PUBLICATIONS

InterDigital Inc., "Discussions on LBT in Unlicensed Higher Frequency Bands;" 3GPP TSG RAN WG1 Meeting #92, R1-1802651, Athens, Greece, Feb. 26-Mar. 2, 2018, 6 pages.

* cited by examiner

METHOD AND DEVICE FOR MITIGATING INTERFERENCE IN UNLICENSED BAND

CROSS-REFERENCE TO RELATED APPLICATIONS

This application is the National Stage filing under 35 U.S.C. 371 of International Application No. PCT/KR2019/004004, filed on Apr. 4, 2019, which claims the benefit of U.S. Provisional Application No. 62/653,530, filed on Apr. 5, 2018, and also claims the benefit of earlier filing date and right of priority to Korean Application Nos. 10-2018-0052835, filed on May 9, 2018, and 10-2018-0057029, filed on May 18, 2018, the contents of which are all hereby incorporated by reference herein in their entirety.

BACKGROUND

Field

The present disclosure relates to wireless communication, and more particularly, to a method of mitigating interference in a wireless communication system, and an apparatus using the method.

Related Art

In 3rd generation partnership project (3GPP), there was an agreement on an overall schedule and concept for 5G standardization in a workshop held in September 2015. An enhanced mobile broadband (eMBB), massive machine type communication (MTC), ultra-reliable and low latency communication (URLLC), or the like was specified as a top-level use-case. In order to satisfy a service scenario and a new requirement, in the 3GPP, it was determined to define a new radio (NR) different from the existing long term evolution (LTE), and both the LTE and the NR were defined as a 5G radio access technique.

The existing LTE supports up to a band of 6 GHz, whereas a 5G technology supports a high frequency band of 100 GHz. Since coverage is short in the high frequency band, it may be necessary to support beam-forming to increase the coverage.

An unlicensed band is a band in which various communication protocols co-exist. Since various interference factors have to be considered, communication is possible after carrier sensing (CS) is performed first to confirm a channel state.

When the beam-forming is supported in the unlicensed band, unexpected interference may occur even if the CS is performed.

SUMMARY

The present disclosure provides a method for mitigating interference in an unlicensed band and a device using the same.

In an aspect, a method performed by a wireless device in an unlicensed band includes receiving a request signal for requesting an initiation of a downlink (DL) transmission from a base station, and if a wireless medium is idle after performing carrier sensing (CS), transmitting a response signal for accepting the initiation of the DL transmission to the base station. The CS is performed for a receive (RX) beam direction acquired from the request signal.

In another aspect, a device in an unlicensed band includes a transceiver configured to transmit and receive a radio signal, and a processor operatively coupled to the transceiver. The processor is configured to control the transceiver to receive a request signal for requesting an initiation of a downlink (DL) transmission from a base station, and control the transceiver to transmit a response signal for accepting the initiation of the DL transmission to the base station if a wireless medium is idle after performing carrier sensing (CS). The CS is performed for a receive (RX) beam direction acquired from the request signal.

Interference between devices can be mitigated in the unlicensed band in which various communication protocols co-exist.

DESCRIPTION OF EXEMPLARY EMBODIMENTS

Technical features described below may be used in a communication standard by the 3rd generation partnership project (3GPP) standardization organization or a communication standard by the institute of electrical and electronics engineers (IEEE) standardization organization. For example, the communication standard by the 3GPP standard organization includes long term evolution (LTE) and/or an evolution of an LTE system. The evolution of the LTE system includes LTE-advanced (LTE-A), LTE-A Pro, and/or a 5G new radio (NR). The communication standard by the IEEE standard organization includes a wireless local area network (LAN) system such as IEEE 802.11a/b/g/b/ac/ax or the like. The aforementioned system uses various multiple access techniques such as orthogonal frequency division multiple access (OFDMA) and/or single carrier-frequency division multiple access (SC-FDMA) or the like in uplink and/or downlink. For example, only the OFDMA may be used in downlink and only the SC-FDMA may be used in uplink, or the OFDMA and the SC-FDMA may be used together in downlink and/or uplink.

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a gNB, a base transceiver system (BTS), an access point, etc.

A transmission reception point (TRP) includes an antenna array having one or more antenna elements. The BS may include one or more TRPs.

A new radio (NR) which is a 5G radio access technique supports various bandwidths and frequency bands for more flexible scheduling. Not only a frequency band below 6 GHz but also a frequency band above 6 GHz is supported. A supported bandwidth is up to 100 MHz in the band below 6 GHz and is up to 400 MHz in the band above 6 GHz. In addition, unlike the 3 GPP LTE in which a subcarrier spacing is fixed to 15 kHz, the NR may support a variety of subcarrier spacing of 15 kHz, 30 kHz, 60 kHz, 120 KHz, and 240 kHz.

The NR standard supports various numerologies. A structure of a radio frame varies depending on the numerology. Table 1 shows an example of the numerology to be supported.

TABLE 1

| Numerology Index ($\mu$) | Subcarrier spacing (kHz) | Cyclic prefix | Number of OFDM symbols per slot | Number of slots per radio frame | Number of slots per subframe |
|---|---|---|---|---|---|
| 0 | 15 | Normal | 14 | 10 | 1 |
| 1 | 30 | Normal | 14 | 20 | 2 |
| 2 | 60 | Normal | 14 | 40 | 4 |
| 2 | 60 | Extended | 12 | 40 | 4 |
| 3 | 120 | Normal | 14 | 80 | 8 |
| 4 | 250 | Normal | 14 | 160 | 16 |

Figure 1:
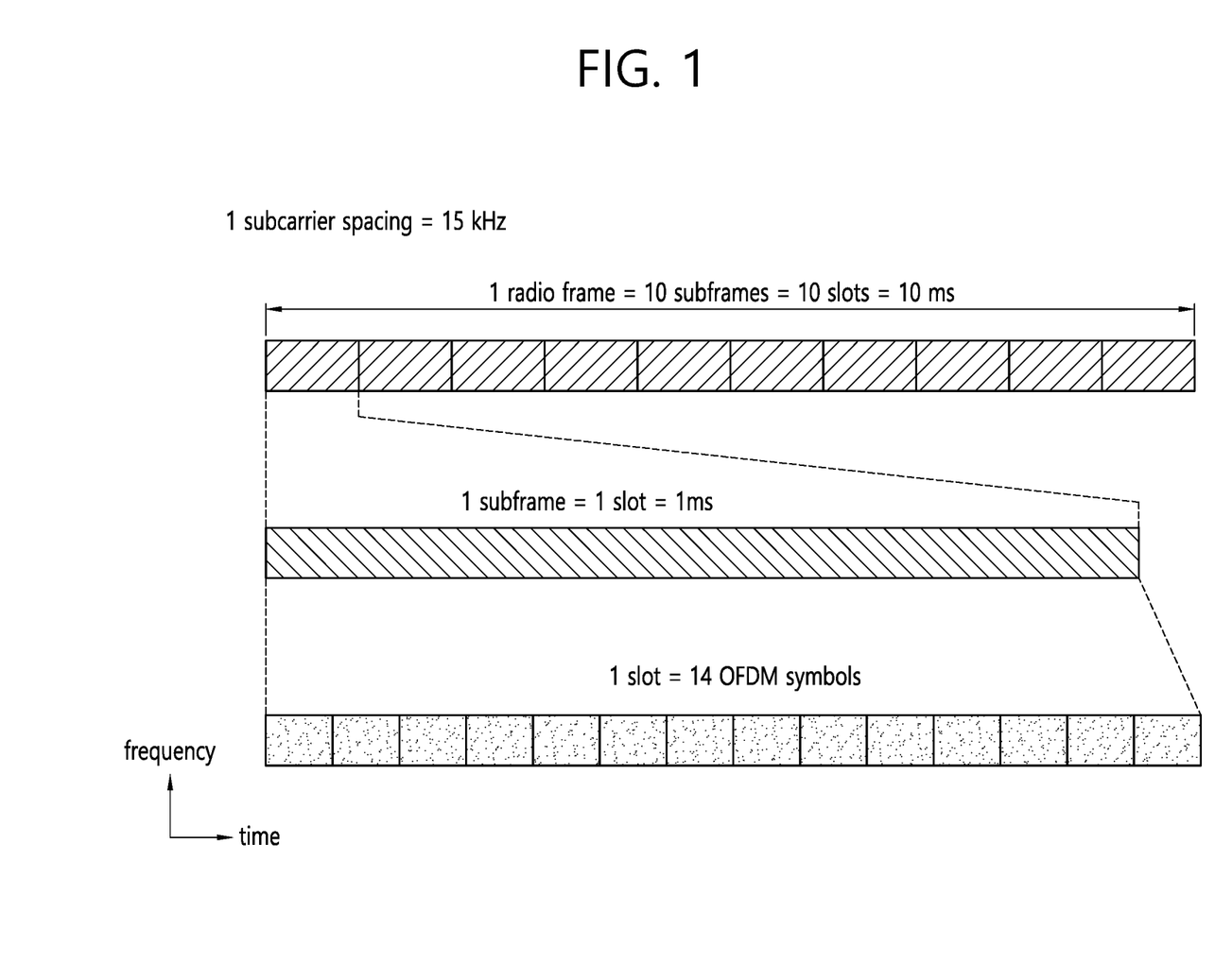
FIG. 1 shows an example of a radio frame structure to which the present disclosure is applied.

FIG. 1 shows an example of a radio frame structure to which the present disclosure is applied. Table 1 shows an example of a numerology index $\mu=0$.

A slot may include a plurality of orthogonal frequency division multiplexing (OFDM) symbols. The number of OFDM symbols in a slot of Table 1 is for exemplary purposes only. The OFDM symbol is only for expressing one symbol period in a time region, and is not limited to a multiple-access scheme or a terminology. For example, the OFDM symbol may be referred to as another terminology such as a single carrier-frequency division multiple access (SC-FDMA) symbol, a symbol period, or the like.

The OFDM symbol in the slot may be divided for downlink (DL), flexible, and uplink (UL). This division may be called as a slot format. Information on the slot format may be reported to a wireless device by a BS. The wireless device may receive information on the slot format through a higher layer signal and/or downlink control information (DCI) on a physical downlink control channel (PDCCH). The wireless device assumes that DL transmission occurs in a DL OFDM symbol or a flexible OFDM symbol. The wireless device may perform UL transmission in a UL OFDM symbol or a flexible OFDM symbol.

A resource block (RB) may include a plurality of subcarriers contiguous in a frequency region. For example, the RB may include 12 subcarriers. A common RB (CRB) is an RB in which an index is determined according to a numerology. A physical RB (PRB) is an RB defined in a bandwidth part (BWP). Assume that there are 20 RBs in the overall bandwidth of a specific numerology. The CRB is indexed from 0 to 19. When the BWP includes four CRBs (from a CRB 4 to a CRB 7) among the 20 RBs, the PRB in the BWP is indexed from 0 to 3.

The BWP may be defined according to a size and a start point from the CRB 0 on a given carrier. A specific number (e.g., up to 4) of BWPs may be configured to the wireless device. Only a specific number (e.g., 1) of BWPs may be activated for each cell at a specific time point. The number of configurable BWPs or the number of BWPs to be activated may be configured commonly for UL and DL or may be configured individually. The wireless device may expect DL transmission only in an activated DL BWP. The wireless device may perform UL transmission only in an activated UL BWP.

The wireless device may obtain a time and/or frequency synchronization with a cell, and may perform cell discovery to obtain a cell identifier (ID). A synchronization channel such as a primary synchronization signal (PSS), a secondary synchronization signal (SSS), a physical broadcast channel (PBCH), or the like may be used for the cell discovery.

Figure 2:
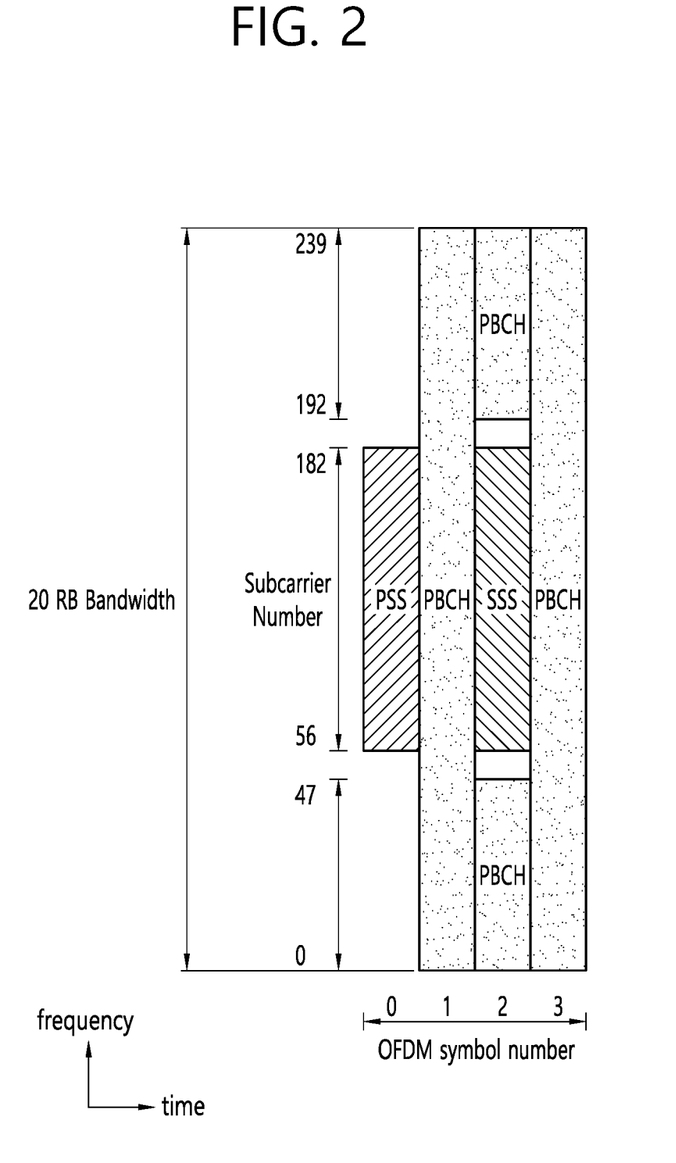
FIG. 2 shows an example of a synchronization channel applied to an embodiment of the present s disclosure.

FIG. 2 shows an example of a synchronization channel applied to an embodiment of the present disclosure. Each of a PSS and an SSS may be transmitted through 127 subcarriers in one OFDM symbol. A PBCH may be transmitted through 240 subcarriers in 3 OFDM symbols.

A synchronization signal/PBCH (SSB) block includes a time/frequency region in which the PSS, the SSS, and the PBCH are transmitted. The PSS is used to obtain a symbol timing of the SSB block, and indicates three hypotheses for identifying a cell ID. The SSS is used to identify the cell ID, and indicates 336 hypotheses. As a result, 1008 physical cell IDs may be indicated through the PSS and the SSS.

The SSB block may be transmitted repeatedly according to a predetermined pattern in an SSB window. The SSB window may have a length of 5 ms. For example, when L SSB blocks are transmitted during one SSB window, all of the L SSB blocks include the same information, but may be transmitted through beams of different directions. That is, a quasi co-location (QCL) may not be applied for the SSB blocks in one SSB window. A beam used to receive the SSB block may be used in a subsequent operation (e.g., a random access operation or the like) between a wireless device and a network. The SSB window may be repeated with a specific period (e.g., 20 ms). The repetition period may be determined individually according to a numerology.

The PBCH has a bandwidth of 20 RBs in 2nd and 4th OFDM symbols, and has a bandwidth of 8 RBs in a 3rd ODM symbol. A demodulation reference signal (DMRS) for decoding the PBCH is included in the PBCH. A frequency region is determined in the DMRS according to a cell ID value. The DMRS for the PBCH may include information indicating an index of an SSB block.

The PBCH may carry a master information block (MIB). System information (SI) is divided into minimum SI (MSI) and other SI (OSI). The MSI may be divided again into MIB and system information type1 (SIB1), and the remaining MSI except for the MIB may be called remaining minimum SI (RMSI).

The MIB includes information required to decode the SIB1. For example, the MIB may include at least any one of the SIB1, a message used in the random access procedure, a subcarrier spacing applied to other system information, a frequency offset between RBs transmitted after an SSB block, a bandwidth of PDCCH/SIB, and information for decoding the PDCCH. The MIB may be transmitted periodically, and the same information may be transmitted repeatedly for a specific time period. The SIB1 includes control information, transmitted repeatedly through the PDSCH, for initial access of the UE and information for decoding a different SIB.

A DL channel includes a physical downlink control channel (PDCCH), a physical downlink shared channel (PDSCH), and a physical broadcast channel (PBCH). The UL channel includes a physical uplink control channel (PUCCH), a physical uplink shared channel (PUSCH), and a physical random access channel (PRACH).

The PDSCH carries DL data. The PBCH carries a master information block (MIB) required for initial access. The PUSCH carries UL data.

The PDCCH carries DCI. The DCI includes a UL grant having resource allocation for scheduling PUSCH transmission and a DL grant having resource allocation for scheduling PDSCH transmission. A control resource set (CORESET) is defined as a resource for monitoring the PDCCH. In order to allow the wireless device to identify an owner or content of the DCI in the PDCCH, a unique identifier is masked to cyclic redundancy check (CRC) of the DCI. This identifier is called a radio network temporary identifier (RNTI). When the DCI includes a UL grant or DL grant for a specific wireless device, a cell RNTI (C-RNTI) is used. When the DCI carries system information, a system information RNTI (SI-RNTI) is used.

The PUCCH carries uplink control information (UCI). The UCI may include hybrid automatic repeat request (HARQ) ACK/NACK and/or channel state information (CSI). The PUCCH may be transmitted in one or more OFDM symbols according to a PUCCH format.

In the following embodiment, an operation may be performed in a licensed band or an unlicensed band. The licensed band is a band in which an exclusive use is ensured to a specific communication protocol or a specific service provider. The unlicensed band is a band in which various communication protocols co-exist and a shared use is ensured. For example, the unlicensed band may include 2.4 GHz and/or 5 GHz bands used by a wireless local area network (WLAN). In the unlicensed band, it is assumed that a channel is secured through contention between communication nodes. Accordingly, communication in the unlicensed band is required to perform channel sensing so as confirm that another communication node does not transmit a signal. For convenience, this is called listen before talk (LBT) or clear channel assessment (CCA). A case where it is determined that another communication node does not transmit a signal in a specific channel is called that 'a channel is idle', 'CCA is confirmed', or 'LBT is confirmed'. When it is said that 'LBT is performed' or 'CCA is performed' or 'carrier sense (CS) is performed', it means that whether a wireless medium is idle or whether a channel of another node is used is confirmed and thereafter an access to the channel is achieved. A cell operating in an unlicensed band is called an unlicensed cell or a licensed-assisted access (LAA) cell. A cell operating in a licensed band is called a licensed cell.

Each serving cell may correspond to a BWP or a carrier. The serving cell may be divided into a primary cell and a secondary cell. The primary cell is a cell in which a wireless device performs initial connection establishment or connection re-establishment. The secondary cell is activated or deactivated by an instruction of the primary cell. When a plurality of serving cells are configured to the wireless device, the primary cell may be a licensed cell, and the secondary cell may be an unlicensed cell. Alternatively, the primary cell may be an unlicensed cell, and the secondary cell may be a licensed cell. A plurality of licensed cells or a plurality of unlicensed cells may be configured.

Beam-forming utilizing a plurality of antennas is used in an NR system. A transmitter transmits a beam which covers a relatively narrow region. However, beam sweeping for transmitting a beam in several directions may be performed to cover the entire coverage of a cell.

Figure 3:
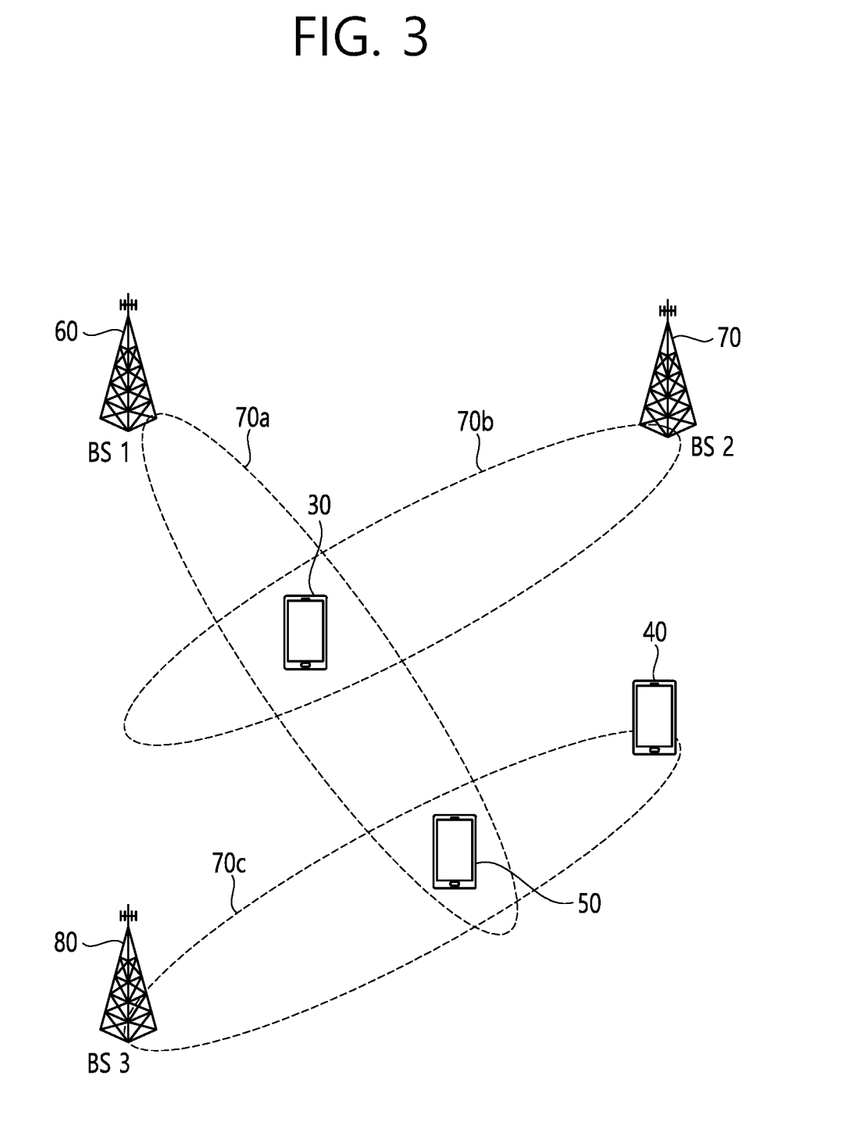
FIG. 3 shows an example in which interference occurs in an unlicensed band due to beam-forming.

FIG. 3 shows an example in which interference occurs in an unlicensed band due to beam-forming.

It is assumed that a BS1 60 transmits a beam1 70*a* to a wireless device1 50, a BS2 70 transmits a beam2 70*b* to a wireless device2 30, and a BS3 80 transmits a beam3 70*c* to a wireless device3 40.

The BS1 60 performs CS before transmitting the beam1 70*a* to the wireless device1 50. However, since the BS1 60 cannot detect the beam2 70*b* and the beam3 70*c*, the BS1 60 transmits the beam1 70*a* to the wireless device1 50 by determining that a channel is idle according to a CS result. Therefore, the wireless device1 50 cannot avoid interference caused by the beam3 70*c*. Further, the wireless device2 30 cannot avoid interference caused by the beam1 70*a*.

With only a CS operation in a transmission node (e.g., a BS in DL transmission, a wireless device in UL transmission) in a beam-forming situation, this shows that it is difficult to predict interference caused by transmission of another transmission node.

Hereinafter, a transmit (TX) beam is a beam transmitted from a perspective of the transmission node. A receive (RX) beam is a beam received from a perspective of a reception node.

When it is said that antenna ports are quasi co-located (QCLed), it means that the wireless device may assume that large-scale properties of a signal received from one antenna port (or a wireless channel corresponding to the antenna port) are entirely or partially identical to large-scale properties of a signal received from another antenna port (or a wireless channel corresponding to the antenna port). Herein, the large-scale properties may include at least one of a Doppler spread and Doppler shift related to a frequency offset, an average delay and delay spread related to a timing offset, and a spatial RX parameter. The wireless device cannot assume that the large-scale properties are identical between antenna ports which are not QCLed. The wireless device independently performs a tracking procedure to acquire a frequency offset and timing offset for each non-QCLed antenna port.

"A direction of a TX beam 1 corresponds to a direction of a TX beam 2" means that directions for directivity of the two TX beams are identical or similar or transmission angles of the two TX beams are similar. The reception node may assume that the two TX beams are transmitted through the QCLed antenna port.

"A direction of an RX beam 1 corresponds to a direction of an RX beam 2" means that directions for directivity of the two RX beams are identical or similar or reception angles of the two RX beams are similar. The reception node may assume that the two RX beams consist of beams corresponding or optimized to a signal transmitted through the QCLed antenna port or the same antenna port.

"A direction of an RX beam 1 corresponds to a direction of a TX beam 1" means that a directivity of the RX beam 1 is set to a direction suitable for receiving the TX beam or is set to a direction suitable for receiving a TX beam of a reference signal (RS) associated with the TX beam 1. A relation between the RX beam and the TX beam may be provided by a BS to the wireless device through specific signaling (RRC/MAC message, etc.).

Figure 4:
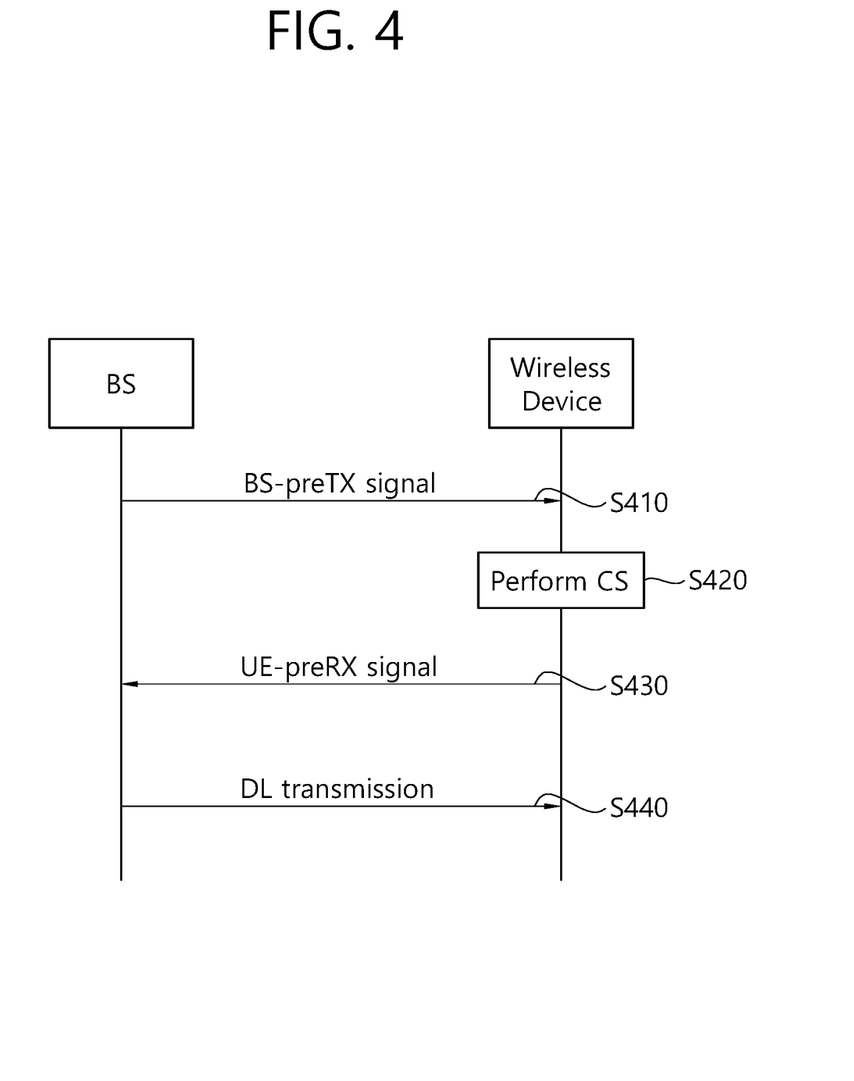
FIG. 4 shows a communication method according to an embodiment of the present disclosure.

FIG. 4 shows a communication method according to an embodiment of the present disclosure.

In step S410, a BS transmits a BS-preTX signal to a wireless device to initiate DL transmission. The BS-preTX signal may be a request signal which requests initiation of DL transmission by the BS.

In step S420, the wireless device performs CS to confirm whether a channel is idle.

In step S430, if the channel is idle, the wireless device transmits a UE-preRX signal to the BS. The UE-preRX signal may be a response signal for accepting the request of DL transmission from the BS. If the channel is not idle, the wireless device may not transmit the UE-preRX signal.

In step S440, the BS performs DL transmission to the wireless device. The DL transmission may include DL data transmission on a PDSCH.

The BS-preTX signal may include DL scheduling information for the PDSCH. The DL scheduling information may include a time/frequency resource, transport block size (TBS), and modulation and coding scheme (MCS) for the PDSCH. The wireless device may perform CS on the frequency resource for the PDSCH. The BS-preTX signal may be transmitted in the form of a PDCCH. Alternatively, DL scheduling information for the PDSCH may be provided in advance through an RRC message or the like, and the BS-preTX signal may provide only a request. The BS-preTX signal may be transmitted in the form of a specific sequence or RS.

The BS-preTX signal may include UL scheduling information used in transmission of the UE-preRX signal. The UL scheduling information may include a time/frequency resource, sequence, and scrambling sequence for the UE-preRX signal.

The UE-preRX signal may be a random access preamble. The BS-preTX signal may include UL scheduling information for scheduling random access transmission. A timing advance (TA) value greater than a typical random access preamble may be applied to the random access preamble for the UE-preRX signal. This is for the UE-preRX signal to have a higher priority. The TA value of the random access preamble for the UE-preRX signal (or an offset value from the TA value of the typical random access preamble) may be pre-set, or may be included in the BS-preTX signal.

The BS-preTX signal may be transmitted through a DL TX beam having a TX beam direction. The TX beam direction may correspond to a beam direction applied to DL transmission. Alternatively, the beam direction applied to DL transmission may be determined based on the TX beam direction.

The wireless device may perform CS according to a direction corresponding to the TX beam direction in which the BS-preTX signal is transmitted. Alternatively, the wireless device may perform CS according to an RX beam direction corresponding to a TX beam direction to be applied to DL transmission. The BS-preTX signal may be transmitted omni-directionally, and the omni-directional BS-preTX signal may specify a beam direction in which CS is to be performed.

The UE-preRX signal may be transmitted through a PUCCH. The UE-preRX signal may be transmitted in the form of a DMRS or a sequence for SRS.

The wireless device may transmit the UE-preRX signal if a measured interference amount is greater (or less) than a threshold according to a CS result. The UE-preRX signal may include information associated with the measured interference amount.

Figure 5:
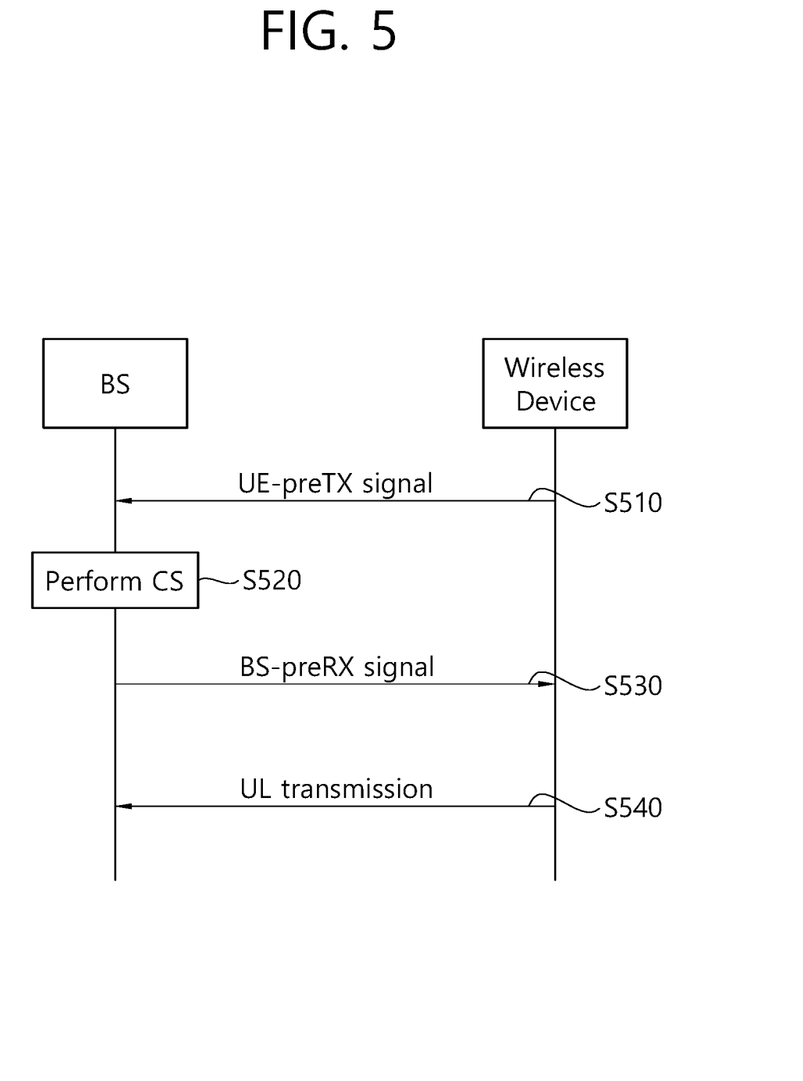
FIG. 5 shows a communication method according to another embodiment of the present disclosure.

FIG. 5 shows a communication method according to another embodiment of the present disclosure.

In step S510, a wireless device transmits a UE-preTX signal to a BS to initiate UL transmission. The UE-preTX signal may be a request signal which requests initiation of UL transmission by the wireless device.

In step S520, the BS performs CS to confirm whether a channel is idle.

In step S530, if the channel is idle, the BS transmits a BS-preRX signal to the wireless device. The BS-preRX signal may be a response signal for accepting the request of UL transmission from the wireless device. If the channel is not idle, the BS may not transmit the BS-preRX signal.

In step S540, the wireless device performs UL transmission to the BS. The UL transmission may include UL data transmission on a PUSCH.

The UE-preTX signal may include UL scheduling information for the PUSCH. The UL scheduling information may include a time/frequency resource, TBS, and MCS for the PUSCH. The BS may perform CS on the frequency resource for the PUSCH. Alternatively, DL scheduling information for the PUSCH may be provided in advance through an RRC message or the like, and the UE-preTX signal may provide only a request. The UE-preTX signal may be transmitted in the form of a PUCCH, specific sequence, or RS.

The UE-preTX signal may be transmitted through a UL TX beam having a TX beam direction. The TX beam direction may correspond to a beam direction applied to UL transmission. Alternatively, the beam direction applied to UL transmission may be determined based on the TX beam direction.

The BS may perform CS according to a direction corresponding to the TX beam direction in which the UE-preTX signal is transmitted.

The BS-preRX signal may be transmitted through a PDCCH. The BS-preRX signal may be transmitted in the form of a DM RS, CSI-RS, or specific sequence.

The BS may transmit the BS-preRX signal if a measured interference amount is greater (or less) than a threshold according to a CS result. The BS-preRX signal may include information associated with the measured interference amount.

Figure 6:
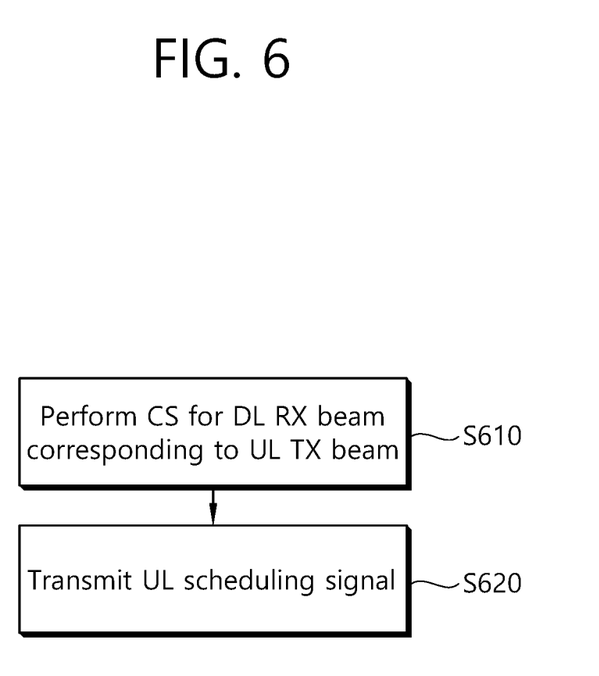
FIG. 6 shows a communication method according to another embodiment of the present disclosure.

FIG. 6 shows a communication method according to another embodiment of the present disclosure.

In step S610, a BS performs CS for a DL RX beam corresponding to a UL TX beam.

In step S620, if a channel (or a wireless medium) is idle according to a CS result, the BS transmits a UL scheduling signal for scheduling UL transmission (e.g., PUSCH) for the UL TX beam.

The UL scheduling signal may be DCI on a PDCCH. Alternatively, the UL scheduling information may be provided in advance, and the UL scheduling information may be a signal (e.g., PDCCH/DCI, DM-RS, CSI-RS, or specific sequence) indicating to perform UL transmission. The UL scheduling information may include information on a UL TX beam direction to be applied by the wireless device to UL transmission.

Embodiments of FIG. 4 to FIG. 6 propose a procedure of reception interference confirmation and communication between a BS and a wireless device. In order to prevent a neighboring node (a neighboring cell, a neighboring BS, or a neighboring wireless device) from causing interference between the BS and the wireless device, this method may be extended as follows.

Hereinafter, a 'C-signal' may mean at least any one of a BS-preTX signal, a BS-preRX signal, a UE-preTX signal, a UE-preRX signal, and a UL scheduling signal in the embodiments of FIG. 4 to FIG. 6.

The C-signal is transmitted in a common format through a radio resource which is common between a plurality of cells. A BS or wireless device which has received the C-signal transmitted by a neighboring node may perform the following operation.

(1) The wireless device which has received the C-signal of the neighboring node may reject DL reception from the BS during a period derived from the C-signal. The wireless device may inform the BS of information on the reception rejection. 'Rejecting DL reception' may mean a method in which a UE-preRX signal is transmitted to the BS to inform that subsequent DL transmission is not desirable. The wireless device may reject DL reception for at least any one of an RX beam direction in which the C-signal is received, an RX beam direction specified by the C-signal, and an RX beam direction corresponding to a TX beam direction specified by the C-signal.

(2) The wireless device which has received the C-signal of the neighboring node may not perform UL transmission for the BS during a period derived from the C-signal. The wireless device may inform the BS of information on transmission interruption. The wireless device may not perform UL transmission on at least any one of a TX beam direction corresponding to an RX beam direction in which the C-signal is received, a TX beam direction corresponding to an RX beam direction specified by the C-signal, and a TX beam direction specified by the C-signal. 'Not performing UL transmission' may mean that CS is performed more strictly in an unlicensed band. A contention window (CW) size and backoff counter value for CS may be increased.

(3) The BS which has received the C-signal of the neighboring node may reject UL reception from the wireless device during a period derived from the C-signal. The BS may inform the wireless device of information on the reception rejection. 'Rejecting UL reception' may mean a method in which a BS-preRX signal is transmitted to the wireless device to inform that subsequent UL transmission is not desirable. The BS may interrupt UL scheduling to the wireless device. The BS may reject UL reception for at least any one of an RX beam direction in which the C-signal is received, an RX beam direction specified by the C-signal, and an RX beam direction corresponding to a TX beam direction specified by the C-signal.

(4) The BS which has received the C-signal of the neighboring node may not perform DL transmission for the wireless device during a period derived from the C-signal. The BS may not perform DL transmission on at least any one of a TX beam direction corresponding to an RX beam direction in which the C-signal is received, a TX beam direction corresponding to an RX beam direction specified by the C-signal, and a TX beam direction specified by the C-signal. 'Not performing DL transmission' may mean that CS is performed more strictly in an unlicensed band. A CW size and backoff counter value for CS may be increased.

The C-signal may include an identifier capable of identifying a node which has transmitted the C-signal. The C-signal may carry information on a time period in which interference is expected after the C-signal is received or a time period in which a node that has received the C-signal rejects reception or shall not perform transmission.

The C-signal may be transmitted with a wide beam having a relatively wide transmission angle so as to be received by not only the BS/wireless device intending to perform DL/UL communication but also the neighboring node. When the communication node is incapable of transmitting the C-signal with the wide beam or intends to avoid a coverage decrease caused by the wide beam, the communication node may repeatedly transmit the C-signal in a plurality of narrow beam directions, thereby obtaining an effect of transmission with the wide beam.

Figure 7:
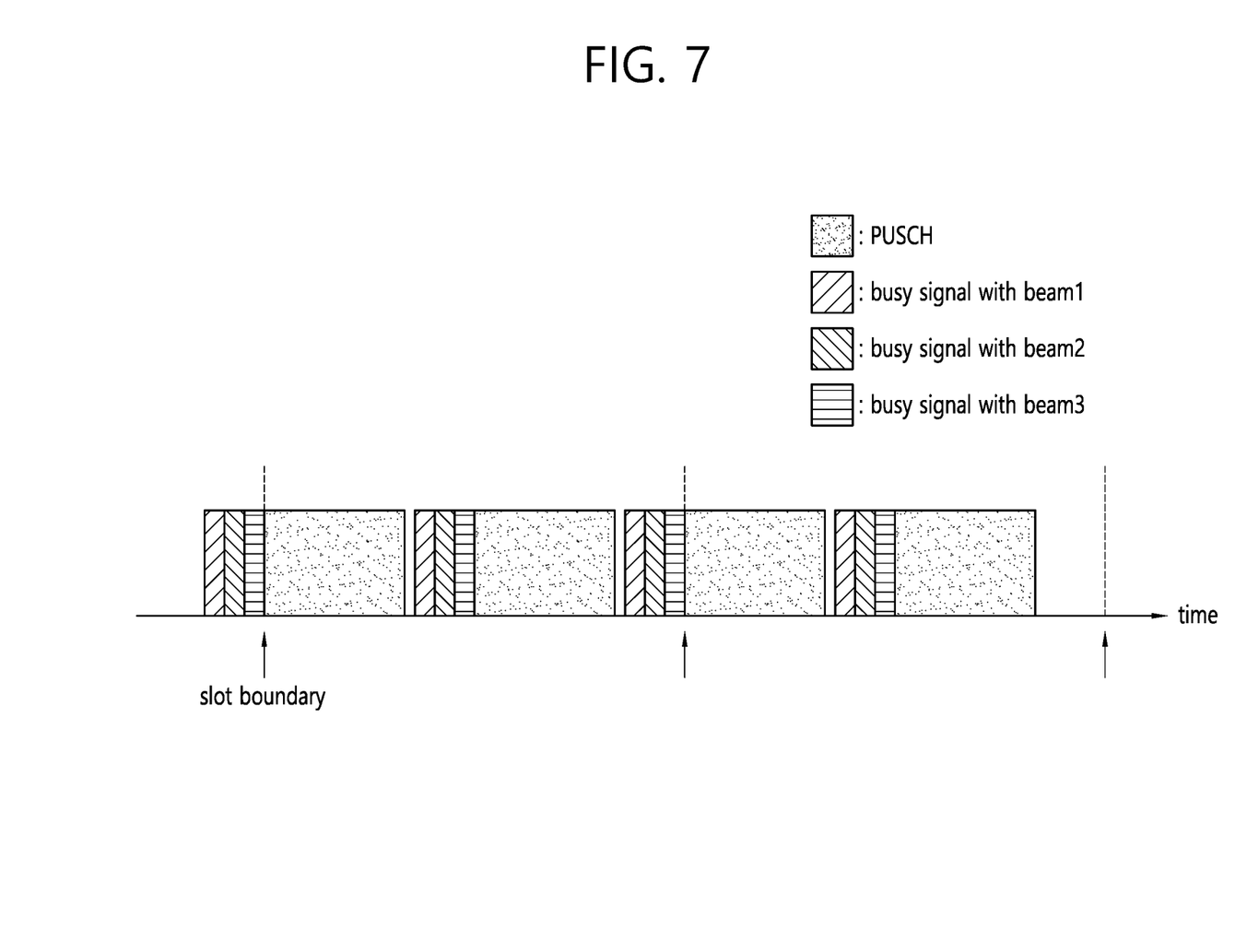
FIG. 7 shows an example of transmitting a busy signal.

FIG. 7 shows an example of transmitting a busy signal.

A communication node (a BS or a wireless device) may transmit a busy signal by using a wide beam having a wider transmission angle than the beam before a signal is transmitted by using a specific beam. The busy signal is a signal transmitted to prevent access to a channel of a neighboring node. The busy signal may be transmitted with the wide beam, thereby allowing the neighboring node which has detected the busy signal to delay transmission. The busy signal may be repetitively transmitted in a plurality of beam directions across a plurality of slots (or a plurality of OFDM symbols), thereby obtaining an effect of transmitting in a wide beam direction.

If a transmission start timing of the communication node is synchronized, the busy signal may be transmitted when transmission starts or every timing at which transmission can start. In the example of FIG. 7, the wireless device transmits a PUSCH across two slots. Assuming that the wireless device can start UL transmission at a slot boundary and a ½ slot boundary, the busy signal is repeatedly transmitted in the plurality of beam directions at each boundary.

The communication node which has detected the busy signal transmitted by the neighboring node may delay DL/UL transmission or may increase a CW size or a backoff counter value.

Transmission of the C-signal and operations according to the proposed embodiment may be configured to be applied only when a communication protocol is based on LTE/NR, and does not coexist with other communication protocols (e.g., Wi-Fi).

Consider a case where a transmission node transmits a plurality of narrow beams. The transmission node may perform CS in each narrow beam direction, and may transmit the beams according to a CS result. The transmission node may perform CS in the plurality of candidate beam directions, may select a beam direction in which CS is successful, and may perform transmission in the selected beam direction. For example, the BS may configure a plurality of candidate beam directions (this candidate beam may be configured based on a DL reference resource) in which UL narrow beam transmission is possible through DCI/RRC/MAC signaling. The wireless device may perform CS for the plurality of candidate beam directions. When the wireless device performs UL transmission in the selected beam direction, the wireless device may provide information on the selected beam direction to the BS. The information may be included in UCI, or may be transmitted in the form of a sequence.

The transmission node may request the reception node to perform CS for a narrow beam direction and to feed back a CS result. The reception node may perform CS for a plurality of candidate beam directions, and may provide the transmission node with information on a beam direction in which CS is successful. For example, the BS may configure a plurality of candidate beam directions (this candidate beam may be configured based on a DL reference resource) in which DL narrow beam transmission is possible through DCI/RRC/MAC signaling. The wireless device may perform CS for the plurality of candidate beam directions, and may provide the BS with the information on the beam direction in which CS is successful. The information may be included in UCI, or may be transmitted in the form of a sequence.

The transmission node may apply a higher CCA threshold to narrow beam transmission than wide beam transmission. When CS is performed, if a measurement value is less than the CCA threshold, it is determined that a wireless medium is idle and CS is successful. A signal transmitted through the narrow beam causes less interference to a system than a signal transmitted through a wide beam. Accordingly, a CS success rate for a narrow beam may be increased so that a transmission opportunity is increased, which may be appropriate for fairness of the transmission opportunity compared to interference of the narrow beam and the wide beam.

Specifically, the smaller the signal transmission angle width (e.g., a 3 dB power attenuation angle), or the greater the TX antenna gain for a specific TX beam direction, the higher the CCA threshold may be applied. When narrow beam transmission subsequent to the CCA operation is performed for one or more beam directions, the smaller the number of narrow beams, the higher the CCA threshold may be applied. The smaller the total transmission angle or the total beam angle width directed by the plurality of narrow beams, the higher the CCA threshold may be applied.

A method of adjusting the CCS threshold according to a TX beam may be applied when CS is performed for a wide beam while transmitting a narrow beam, or when a RX beam width applied to CCA is greater than a TX beam width, or when coherence between the TX beam and the RX beam cannot be guaranteed by at least a specific level.

When the narrow beam is used for the measurement for CS, the reception node may apply a lower CCA threshold than the wide beam. This is because an interference amount received through the narrow beam may be relatively smaller than an interference amount which exists in general around the reception node. Specifically, the smaller the energy reception angle width (e.g., a 3 dB power attenuation angle) or the greater the RX antenna gain for a specific reception direction, the lower the CCA threshold may be applied.

Optionally, the reception node may apply a higher CCA threshold than a wide beam when a narrow beam is used for measurement for CS. This is because energy reception can be detected by being amplified compared to reception through the wide beam according to implementation of an RX antenna. A signal transmitted with a relatively far distance or with weak TX power may correspond thereto. Specifically, the smaller the energy reception angle width (e.g., a 3 dB power attenuation angle) or the greater the RX antenna gain for a specific reception direction, the higher the CCA threshold may be applied.

Figure 8:
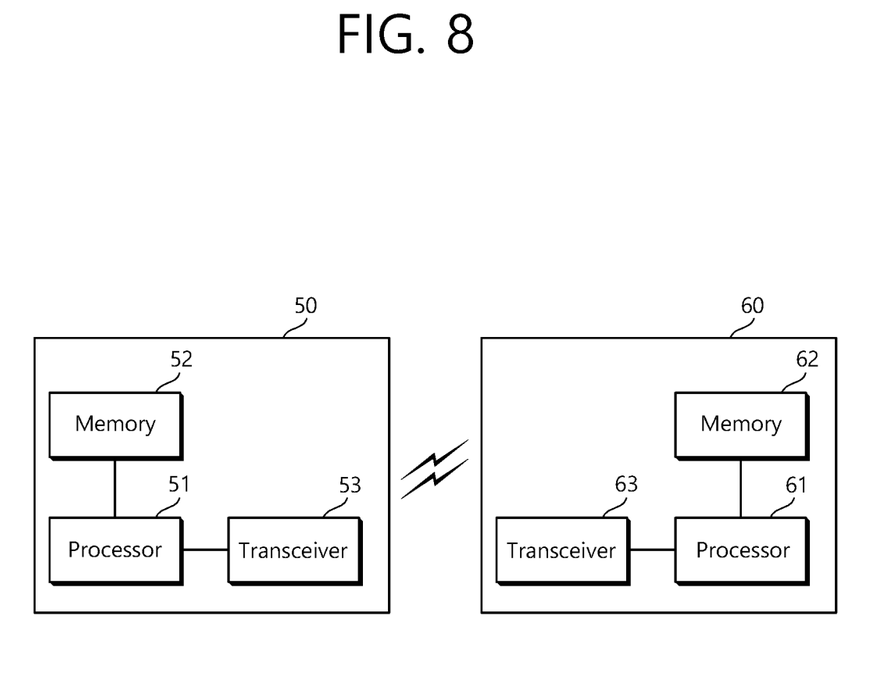
FIG. 8 is a block diagram showing a wireless communication system for implementing an embodiment of the present disclosure.

FIG. 8 is a block diagram showing a wireless communication system for implementing an embodiment of the present disclosure.

A wireless device 50 includes a processor 51, a memory 52, and a transceiver 53. The memory 52 is operatively coupled with the processor 51 to store various instructions executed by the processor 51. The transceiver 53 is operatively coupled with the processor 51 to transmit and/or receive a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

ABS 60 includes a processor 61, a memory 62, and a transceiver 63. The BS 60 may operate in an unlicensed band. The memory 62 is operatively coupled to the processor 61 to store various instructions executed by the processor 61. The transceiver 63 is operatively coupled to the processor 61 to transmit and/or receive a radio signal. The processor 61 implements the proposed functions, procedures, and/or methods. In the aforementioned embodiment, an operation of the BS may be implemented by the processor 61. When the aforementioned embodiment is implemented with a software instruction, the instruction may be stored in the memory 62, and may be executed by the processor 61 to perform the aforementioned operation.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method performed by a wireless device in an unlicensed band, the method comprising:

receiving, from a base station, a primary synchronization signal, a secondary synchronization signal and a physical broadcast channel (PBCH) for performing cell search in a synchronization signal (SS)/PBCH block, wherein the SS/PBCH block includes 4 orthogonal frequency division multiplexing (OFDM) symbols in time domain and 240 subcarriers in frequency domain, wherein the PBCH includes system information related to a subcarrier spacing to be used for random access, wherein a master information block (MIB) is received through the PBCH, and wherein the MIB includes at least one parameter which is required to decode a system information block (SIB) 1;

receiving, from the base station, a request signal, which informs a receive (RX) beam direction, for requesting an initiation of a downlink (DL) transmission;

transmitting, to the base station, a random access preamble in response to the request signal, wherein, based on the wireless device determining that a wireless medium is idle based on performing carrier sensing (CS) for the RX beam direction, the wireless device transmits a response signal for accepting the initiation through the random access preamble, wherein the random access preamble related to the response signal has a higher priority than other random access preambles, and wherein a timing advance (TA) value larger that a TA value of the other random access preambles is applied to the random access preamble related to the response signal.

2. The method of claim 1, wherein the RX beam direction corresponds to a transmit (TX) beam direction in which the request signal is transmitted.

3. The method of claim 1, wherein the RX beam direction corresponds to a DL beam direction applied to the DL transmission, and the DL beam direction is acquired from the request signal.

4. The method of claim 1, wherein the request signal comprises scheduling information used to transmitting the random access preamble.

5. The method of claim 1, wherein the response signal comprises information on an interference amount measured by the wireless device.

6. A wireless device in an unlicensed band, the wireless device comprising:
a transceiver configured to transmit and receive a radio signal; and
a processor operatively coupled to the transceiver and configured to:
control the transceiver to receive, from a base station, a primary synchronization signal, a secondary synchronization signal and a physical broadcast channel (PBCH) for performing cell search in a synchronization signal (SS)/PBCH block,
wherein the SS/PBCH block includes 4 orthogonal frequency division multiplexing (OFDM) symbols in time domain and 240 subcarriers in frequency domain,
wherein the PBCH includes system information related to a subcarrier spacing to be used for random access,
wherein a master information block (MIB) is received through the PBCH,
wherein the MIB includes at least one parameter which is required to decode a system information block (SIB) 1;
control the transceiver to receive, from the base station, a request signal, which informs a receive (RX) beam direction, for requesting an initiation of a downlink (DL) transmission; and
control the transceiver to transmit, to the base station, a random access preamble in response to the request signal,
wherein, based on the wireless device determining that a wireless medium is idle based on performing carrier sensing (CS) for the RX beam direction, the wireless device transmits a response signal for accepting the initiation through the random access preamble,
wherein the random access preamble related to the response signal has a higher priority than other random access preambles, and
wherein a timing advance (TA) value larger that a TA value of the other random access preambles is applied to the random access preamble related to the response signal.

7. The wireless device of claim 6, wherein the RX beam direction corresponds to a transmit (TX) beam direction in which the request signal is transmitted.

8. The wireless device of claim 6, wherein the RX beam direction corresponds to a DL beam direction applied to the DL transmission, and the DL beam direction is acquired from the request signal.

9. The wireless device of claim 6, wherein the request signal comprises scheduling information used to transmitting the random access preamble.

10. The wireless device of claim 6, wherein the response signal comprises information on an interference amount measured by the wireless device.

* * * * *